M. B. GIBERSON.
WHEEL.
APPLICATION FILED NOV. 15, 1919.
1,396,107.
Patented Nov. 8, 1921.
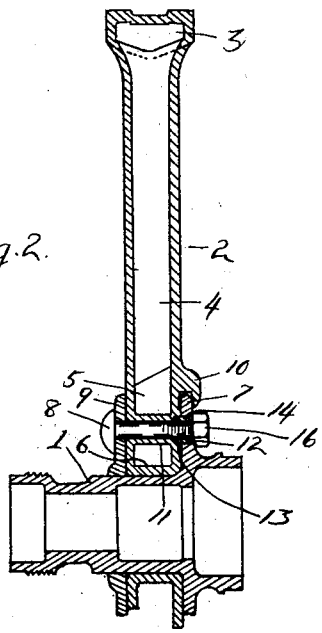
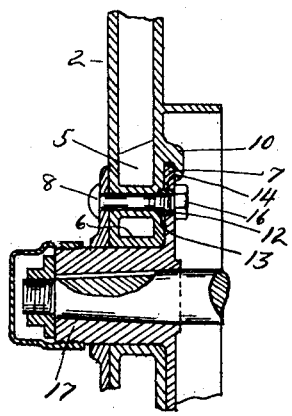
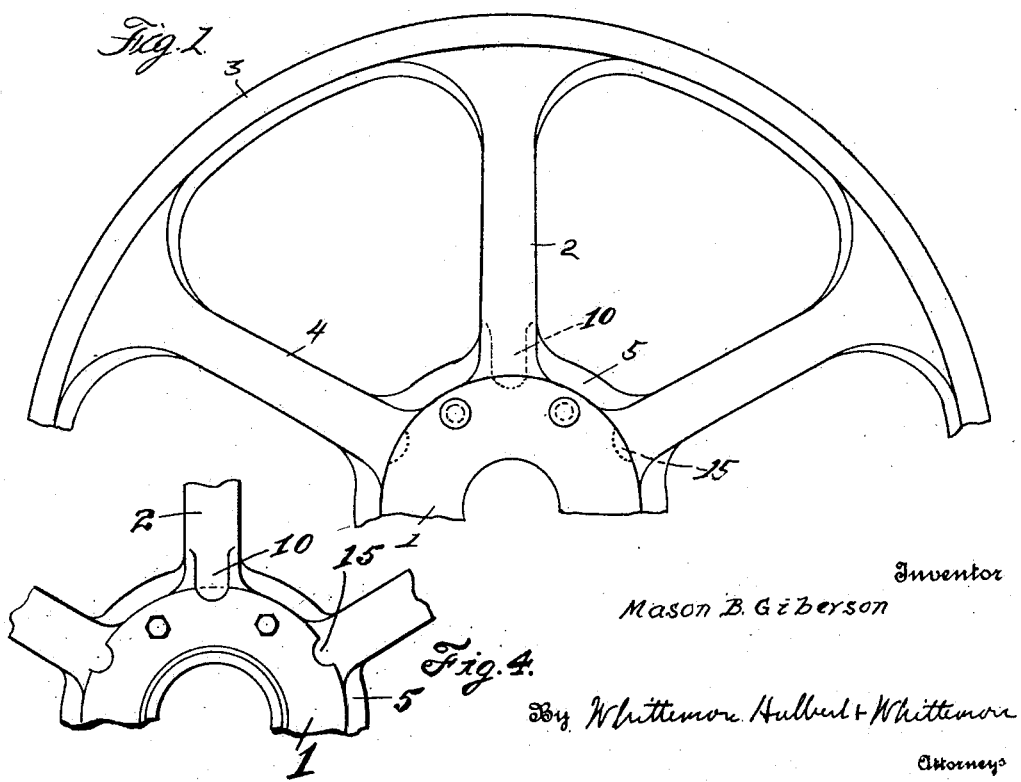
Inventor
Mason B. Giberson
By Whittemore, Hulbert & Whittemore
Attorneys

UNITED STATES PATENT OFFICE.

MASON B. GIBERSON, OF SAGINAW, MICHIGAN.

WHEEL.

1,396,107.  Specification of Letters Patent.  Patented Nov. 8, 1921.

Application filed November 15, 1919. Serial No. 338,215.

*To all whom it may concern:*

Be it known that I, MASON B. GIBERSON, a citizen of the United States of America, residing at Saginaw, in the county of Saginaw and State of Michigan, have invented certain new and useful Improvements in Wheels, of which the following is a specification, reference being had therein to the accompanying drawing.

The invention relates to vehicle wheels and more particularly to metallic wheels having separate hub and spoke sections. One of the objects of the invention is to provide a construction having auxiliary means for securing the spoke section to the hub to assist the bolts securing the spoke section to the hub. Another object is the provision of a construction in which the spoke section is hollow and having means for preventing the crushing in of the side walls of the spoke section by the means for securing the spoke section to the hub. A further object is to provide a construction having means independent of the means for securing the spoke section to the hub for rotating the one from the other, thereby preventing shearing of the securing means.

In the drawings:

Figure 1 is a front side elevation of a portion of the vehicle wheel embodying my invention;

Fig. 2 is a central cross section therethrough;

Fig. 3 is a similar view of a modified construction;

Fig. 4 is a rear side elevation of a portion of the wheel shown in Fig. 1.

1 is the hub of the vehicle wheel and 2 the spoke section mounted upon the hub. This spoke section is hollow and comprises the hollow rim 3, the hollow radial spokes 4 and the hollow hub portion 5 having the transversely extending wall 6 at its inner end which engages the hub 1. The hub 1 has the integral radially extending flange 7 which is adapted to be clamped to the spoke section 2 by means of the series of spaced bolts 8 extending transversely through the hub portion 5 of the spoke section and the flange 7. Upon the side of the spoke section opposite the flange 7 the removable flange 9 is provided which is also sleeved upon the hub 1 and is secured to the spoke section 2 and flange 7 by means of the bolts 8.

For the purpose of the bolts 8 in securing the spoke section to the hub the spoke section 2 is provided with the spaced lugs 10 which are adapted to embrace the peripheral edge of the flange 7 to provide an additional or auxiliary means for clamping the flange and spoke section to each other. This spoke section is formed of malleable iron, so that if the inner surfaces of the lugs 10 do not firmly engage the outer surface of the flange 7 the lugs 10 can be peened inwardly to secure a firm engagement. With this arrangement, the lugs tend to prevent elongation of the bolts.

In order to prevent the crushing inwardly of the side walls of the spoke section 2 the hub portion 5 thereof is provided with the integral spacers 11 extending between the side walls. These spacers are bored to receive the bolts 8.

For the purpose of protecting the bolts 8 from shearing upon rotation of the wheel the collars 12 are provided surrounding the bolts 8 and engaging in the annular recesses 13 in the hub portion 5 and in the apertures 14 in the flange 7, the arrangement being such that the collars 12 have a driving connection between flange 7 and spoke section 2 independent of the bolts 8.

To permit of the ready assembling of the vehicle wheel the periphery of the flange 7 upon the hub 1 is provided with the notches 15 which correspond to the lugs 10 upon the spoke section 2. The flange 7 is moved into engagement with the side wall of the hub portion 5 by registering the notches 15 with the lugs 10 and then the hub is rotated relative to the spoke section. If the lugs 10 do not firmly engage the flange 7 they are forced inwardly as by peening. The bolts 8 can be readily inserted through the registered apertures in the removable flange 9, hub portion 5 and the integral flange 7, and the collars 12 inserted in place, after which the nuts 16 threadedly engaging the ends of the bolts 8 can be tightened down.

As shown in Figs. 1 and 2 the vehicle wheel is not a drive wheel while as shown in Fig. 3 the vehicle wheel is a drive wheel, in which the hub 17 is provided with a keyway for non-rotatively securing the hub to the drive shaft (not shown).

What I claim as my invention is:

1. In a metallic vehicle wheel, the combination with a hub having a flange, of a spoke section mounted upon said hub, bolts for clamping said spoke section to said flange, and lugs upon said spoke section and embracing said flange to assist said bolts in securing said spoke section to said hub.

2. In a metallic vehicle wheel, the combination with a hub having a flange, of a spoke section mounted upon said hub and adjacent to one side of said flange, and lugs upon said spoke section and engaging the opposite side of said flange for securing said spoke section upon said hub.

3. In a vehicle wheel, the combination with a hub having a flange, of a spoke section mounted upon said hub, bolts provided with nuts and extending transversely through said spoke section and flange for clamping the same to each other, and a collar independent of said nuts and surrounding each of said bolts, said collar having a driving connection between said spoke section and flange independent of said bolts.

4. In a metallic vehicle wheel, the combination with a hub having a flange, of a spoke section rotatably mounted upon said hub, integral locking means upon said spoke section engaging said flange for securing said spoke section to said hub, and means for maintaining said spoke section in fixed rotative position upon said hub.

5. In a vehicle wheel, the combination with a hub having a flange, of a spoke section rotatably mounted upon said hub, means for securing said spoke section upon said hub including a locking member upon said spoke section engageable with said flange by a rotative movement of said spoke section relative to said hub, and bolts engaging said spoke section and flange and preventing relative rotation of said spoke section and hub.

In testimony whereof I affix my signature.

MASON B. GIBERSON.